United States Patent [19]

Sugahara

[11] 3,788,436

[45] Jan. 29, 1974

[54] WEAR RESISTANT GUIDES FOR CLUTCH SHOE

[76] Inventor: Eisuke Sugahara, Akabanedai, Kita-ku, Tokyo, Japan

[22] Filed: June 9, 1972

[21] Appl. No.: 261,465

[30] Foreign Application Priority Data

July 10, 1971  Japan.............................. 46/60786

[52] U.S. Cl. ........... 192/88 B, 192/107 T, 188/367, 192/70.2
[51] Int. Cl. .............................................. F16d 25/04
[58] Field of Search ........... 188/367; 192/88 B, 70.2, 192/107 T

[56] References Cited
UNITED STATES PATENTS

| | | |
|---|---|---|
| 2,210,111 | 8/1940 | Best ..................................... 188/367 |
| 2,730,219 | 1/1956 | Kitto ........................... 192/107 T X |
| 3,605,967 | 9/1971 | Warren et al. ..................... 192/70.2 |
| 2,710,087 | 6/1955 | Picard ............................... 192/88 B |
| 3,305,060 | 2/1967 | Zeidler ............................. 192/70.19 |
| 3,618,726 | 11/1971 | Sugahara .......................... 192/88 B |

Primary Examiner—Benjamin W. Wyche
Attorney, Agent, or Firm—Sughrue, Rothwell, Mion, Zinn & Macpeak

[57]          ABSTRACT

An air clutch is characterized in having abrasion resistant treatment of the guide walls containing the torque bar in a frictional contact element made of aluminum alloy.

3 Claims, 5 Drawing Figures

WEAR RESISTANT GUIDES FOR CLUTCH SHOE

BACKGROUND OF THE INVENTION

1. Field of the Invention

The present invention relates to an improvement in an air brake or air clutch employing an aluminum alloy frictional contact member and more specifically to wear-resistant treatment given to guide walls containing a torque bar.

2. Description of the Prior Art

An air brake or clutch is well-known in which a frictional contact member is formed in annular shape and equipped with a friction plate on its inner or outer periphery, which friction plate is placed facing the inner or outer periphery of rotary drum fixed to the revolving shaft of the clutch or brake, and when the pressure fluid is supplied to a distensible member to distend the latter, the friction plate is pressed to the outer or inner periphery of the rotary drum to make them engage and thereby the revolving power of the revolving shaft is transmitted to the rotary member to be revolved or to be braked.

But when disengaging the friction plate from the rotary drum by discharging the pressure fluid out of the distensible member while the transmission of revolving power is occurring with the friction plate and the rotary drum engaged by the expansion of said distensible member by forced injection of the pressure fluid, there have often been troubles in which speedy discharge of the pressure fluid is difficult because of inadequacy in the reverting force of the distensible member with the result that the friction plate and the rotary drum fall into the so-called "half-clutch" condition and the status of the friction of the contact faces of the two changes from the stationary friction to the dynamic friction. Moreover, the dynamic friction tends to last relatively long, causing undue heating of the friction plate and increased wear and tear of the same and this has been the drawback found in common with conventional air brakes or clutches.

In order to overcome the above-mentioned drawback, an improvement has been proposed to provide between the friction plate 3 and the distensible member 2 attached to the inner periphery of the rotary member to be revolved 1, a frictional contact member 4. The guide walls 41, 42 of said frictional contact member 4 are provided with torque bar 5 capable to move up and down, said torque bar 5 being supported at both ends by inserting into the supporting holes 6 provided in said rotary member to be revolved 1 in a freely revolvable manner. Said torque bar 5 has plate springs 7 at both ends, right and left, with each end contacting the lower face of the upper wall of said frictional contact member 4, so that the reverting power of distensible member 2 is increased by the elasticity of the plate spring 7 to help to accelerate the disengagement of the distensible member 2 from the friction plate 3 by means of speeding the discharge of the pressure fluid forcibly injected into the distensible member 2.

However, even in this type of air clutch, the wear and tear will be found to proceed after a prolonged use correlatively on the surfaces of the guide walls 41, 42 and the torque bar 5 by frictional contact of the guide walls 41, 42 of the frictional contact member 4 and the torque bar 5 because the frictional contact member 4 and the torque bar 5 are both made of aluminum alloy.

Such wear and tear causes the failure of transmission mechanism to transmit the rotary torque from the torque bar 5 to the rotary member to be revolved 1 through the side plates 8, 9 and furthermore reduces the strength of the guide walls 41, 42 of the frictional contact member 4 and in the worst case causes breakdown of the guide walls 41, 42.

SUMMARY OF THE INVENTION

To overcome the above-mentioned drawback, the present invention proposes an improved abrasion resisting treatment to be given to the guide walls 41, 42 of the frictional contact member 4 made of aluminum alloy.

DESCRIPTION OF PREFERRED EMBODIMENTS

Figure 1:
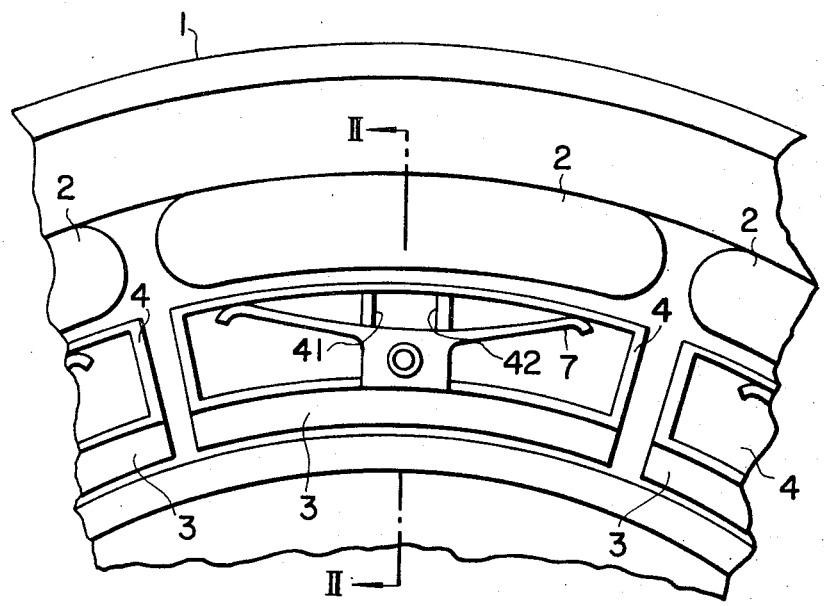
FIG. 1 is a front elevational view of a portion of a prior art air clutch to which the present invention has application.
Figure 2:
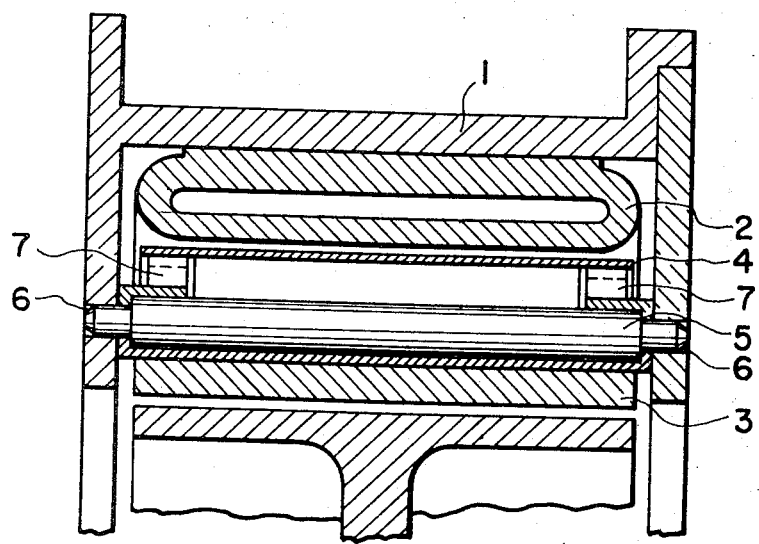
FIG. 2 is a sectional view of the air clutch of FIG. 1 taken about line 2—2.
Figure 3:
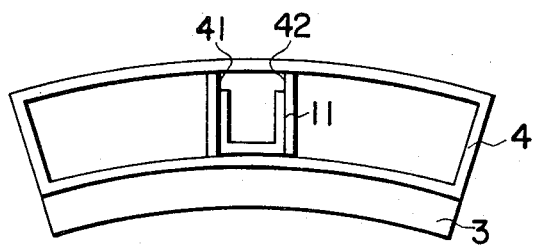
FIG. 3 is a side elevational view of one form of an improved frictional contact bar of the present invention which is employable in the air clutch of FIGS. 1 and 2.
Figure 4:
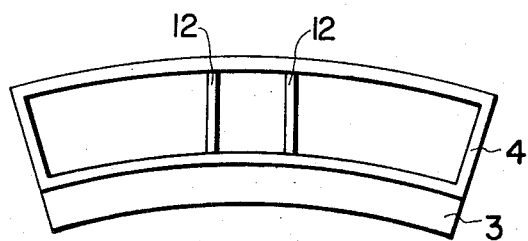
FIG. 4 is a side elevational view of a second embodiment of the present invention.
Figure 5:
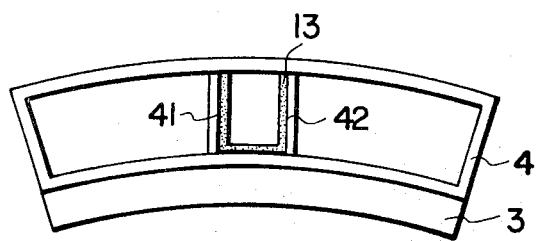
FIG. 5 is a side elevational view of a third embodiment of the present invention.

In the following, an explanation will be made on this invention with reference to the attached drawings. The abrasion resisting treatment disclosed by this invention can be made in any of the following ways:

In one process, an abrasion resisting piece 11 made of rolled steel plate cut in a proper size is inserted in the guide walls 41, 42 of the frictional contact member 4 as shown in FIG. 3. Another process is, as seen in FIG. 4, to cover the guide walls 41, 42 of the frictional contact member 4 by casting with abrasion resisting alloy 12 such as ferro-alloy or copper alloy. In another process as seen in FIG. 5, an abrasion resisting alloy 13 in molten form is injected on the surface of a core (not shown) to form guide walls 41, 42 and afterward when molten alloys were poured into the mold, said abrasion resisting alloy 13 previously applied on said core is transferred onto the surface of the guide walls 41, 42 of the frictional contact element 4.

By giving abrasion resisting treatment to the guide walls 41, 42 of the frictional contact element 4 in accordance with the disclosure of this invention, the wear and tear of the surfaces of the guide walls 41, 42 and the torque bar 5 can be prevented and the breakdown can be eliminated, and the transmission mechanism of rotary torque from the torque bar 5 to the rotary member 1 to be revolved through the side plates 8, 9 can be made constantly stable.

The abrasion resisting piece 11 is advisable to be made in the U-shaped curve in order to give better stability during operation of the machine. This abrasion resisting piece 11 can be easily replaced by a new one when it shows wear and tear after long use.

While the invention has been particularly shown and described with reference to preferred embodiments thereof, it will be understood by those skilled in the art that various changes in form and details may be made therein without departing from the spirit and scope of the invention.

What is claimed is:

1. In an air clutch or the like including a plurality of radially shiftable, air biased frictional contact elements mounted for radial movement by a torque bar in sliding contact with spaced contact element guide walls sandwiching the bar, the improvement wherein: the faces of the guide walls in contact with said bar are abrasion resistant and comprise a transfer coating from a core during casting of said frictional contact elements.

2. The air clutch as claimed in claim 1, wherein said transfer coating comprises cast abrasion resistant metal alloy.

3. The air clutch as claimed in claim 2, wherein said abrasion resistant metal alloy comprises one alloy of the group consisting of ferro alloy and copper alloy.

* * * * *